(12) United States Patent
Connell (10) Patent No.: US 9,928,174 B1
(45) Date of Patent: Mar. 27, 2018

(54) CONSISTENT CACHING

(71) Applicant: Amazon Technologies, Inc., Seattle, WA (US)

(72) Inventor: Paul Connell, North Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 43 days.

(21) Appl. No.: 15/072,260

(22) Filed: Mar. 16, 2016

(51) Int. Cl.
*G06F 12/08* (2016.01)
*G06F 12/0815* (2016.01)
*G06F 12/0804* (2016.01)
*G06F 12/0868* (2016.01)

(52) U.S. Cl.
CPC ...... *G06F 12/0815* (2013.01); *G06F 12/0804* (2013.01); *G06F 12/0868* (2013.01); *G06F 2212/1032* (2013.01); *G06F 2212/281* (2013.01); *G06F 2212/313* (2013.01); *G06F 2212/608* (2013.01)

(58) Field of Classification Search
CPC ............. G06F 12/0815; G06F 12/0804; G06F 12/0868; G06F 2212/1032; G06F 2212/281; G06F 2212/313; G06F 2212/608
See application file for complete search history.

(56) References Cited

U.S. PATENT DOCUMENTS

| | | | |
|---|---|---|---|
| 9,064,124 B1 | 6/2015 | Davis et al. | |
| 9,460,141 B1* | 10/2016 | Coman | G06F 17/30345 |
| 9,489,306 B1* | 11/2016 | Murugesan | G06F 12/0815 |
| 2003/0065894 A1* | 4/2003 | Bonola | G06F 9/526 |
| | | | 711/152 |
| 2006/0090051 A1* | 4/2006 | Speier | G06F 13/1663 |
| | | | 711/163 |
| 2009/0228494 A1* | 9/2009 | Beichter | G06F 17/30362 |
| 2013/0117498 A1* | 5/2013 | Brosnan | G06F 12/0871 |
| | | | 711/103 |
| 2016/0034357 A1* | 2/2016 | Anglin | G06F 11/1458 |
| | | | 714/4.11 |
| 2016/0155491 A1* | 6/2016 | Roberts | G11C 11/40607 |
| | | | 711/106 |

* cited by examiner

*Primary Examiner* — Mano Padmanabhan
*Assistant Examiner* — Patrick Borges
(74) *Attorney, Agent, or Firm* — Knobbe, Martens, Olson & Bear, LLP (57) ABSTRACT

A consistent caching service for managing data consistency between a cache system and backing store is provided. The consistent caching service compares an origin token and a parity token associated with the cached copy of the data item to determine consistency of the data item. The origin and parity tokens may be generated by an operation that caused population of the data item to the cache. The parity token may be invalidated by a write operation of the data item, thus causing a mismatch between the two tokens.

20 Claims, 7 Drawing Sheets

CONSISTENT CACHING

BACKGROUND

Generally described, computing devices and communication networks can be utilized to exchange information. In a common application, a device can request content from another device via the communication network. For example, a user at a personal computing device can utilize a software browser application to request a Web page or Web application from a server device via the Internet. For another example, a user of a content providing service can utilize a display device (e.g., television, computer, mobile device, smartphone, tablet) to request content (e.g., an audio presentation, video presentation, audiovisual presentation, movie, television show, video, podcast) to be downloaded or streamed from a server device via the Internet to the display device. In such embodiments, the user computing device or display device can be referred to as a client device and the server device can be referred to as a content provider.

Content providers are generally motivated to provide requested content to client devices often with consideration of cost, speed, or efficiency associated with the transmission of the content data. For larger scale implementations, a content provider may receive content requests from a high volume of client devices which can place a strain on the content provider's computing resources. Additionally, the content requested by the client devices may have a number of components, which can further place additional strain on the content provider's computing resources.

One attempt to improve the delivery of content to client device includes utilization of caching components and processes. Generally described, caching refers to the storage of information provided by a content provider in any storage (e.g., local memory) with greater locality than the backing store where the information is persistently maintained. Typically, the amount of resources required to access the information in the cache is less than the resources required to retrieve the information from the source. Accordingly, once information is retrieved from the content source, it can be stored in the cache for use in subsequent requests for the information. Generally, the greater the number of requests that can be served from the cache, the faster and smoother the overall system performance.

Consistency between the data stored in the cache and the data stored in the backing store (e.g., source of content data) may be critical to many computing systems or services. For example, a content provider may periodically update data maintained in the source. After such an update, any cached versions of the data may include incorrect or out of date information. The content provider may have policies that prevent the use of out of date cache information or a requirement for the cache to be updated or purged, thus consistency between data stored in the cache and data stored in the backing store must be properly maintained. The management of data consistency for a cache system may become complicated when multiple computing devices, applications, services, processes, or threads exercise overlapping or conflicting access to data via a same cache system.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

When multiple computing devices, applications, services, processes, or threads access data via a shared cache system, data inconsistency between the cache system and the corresponding backing store may arise. For example, each data item stored in the cache system may typically be associated with an expiration time, such as a time to live (TTL), after which the cached data item is unavailable for use (e.g., subject to overwrite or evicted from the cache). Illustratively, TTL is a variable value that is supposed to be set for a period of time in which the requested data item is available for use. Traditionally, a cache system may respond to a read request (e.g., a "get" or "query" request) for a data item by returning a version of the data item that is currently cached, if the associated TTL has not expired. However, in some scenarios, the value of the cached data item may become stale during the TTL time period, because a conflicting write request (e.g., a "set" or "update" request to the backing store) may have already asked for an update to the data item's value during the cache item's lifetime (e.g., during the associated TTL). Therefore, the updating of the data item may have been completed or ongoing at the backing store during the TTL time period. Consequently, the cache system may return a stale or invalid data item because its associated TTL has not expired. This situation may be exacerbated when there is heavy traffic to the cache system, where multiple read operations for same data items race against each other. Overlapping write operations for the same data item may also be ongoing at the backing store, further increase the likelihood for cached data items to become stale or invalid.

This present disclosure generally relates to the management of cache systems. In particular, this disclosure relates to the management of data requests (e.g., read or write requests) to a cache system, and the processing of the data requests to maintain data consistency between the cache system and corresponding backing store(s). In accordance with an illustrative embodiment, a consistent caching service associates each cached data item with additional information that that can used to determine the validity or staleness of the cached data item. More specifically, the additional information can be in the form of an origin token and a parity token that are included in or referenced by an entry or record of the cached data item as stored in the cache system. In some embodiments, the consistent caching service manages race conditions that exist among different data access requests without applying locks on cache records or other cache locking mechanism that prevents the race conditions.

The origin token and the parity token may match each other when generated by an operation that writes the data item to the cache. For example, both tokens may identify, reference, or are otherwise traceable to a same operation or entity that caused population of the cache with the data item. As another example, both tokens may include a same time stamp of sufficient accuracy, a same randomly generated number or alpha-numerical value, or other unique identifier. When the two tokens match, the consistent caching service may determine that their associated cached data item is valid and consistent with the backing store, and may return the cached data item in response to a read request for the data item.

A mismatch between the origin token and the parity token may occur when the parity token has been invalidated due to the processing of a write request for the data item. For example, in response to receiving the write request, the consistent caching service may write new value(s) for the data item directly to the backing store rather than to the cache system. Once the write operation of the data item to the backing store is completed, the cached version of the data item no longer reflects the data item's most up-to-date value(s), and the consistent caching service invalidates (e.g., by deleting or nullifying) the parity token associated with the cached data item, thus creating a mismatch between the origin and parity tokens. A mismatch between the origin token and the parity token may also occur when one of the two tokens is updated but not the other, for example, due to data operation failures, exceptions, or asynchronousness.

When the two tokens do not match, the consistent caching service may determine that their associated cached data item is invalid or stale, and will not return the cached data item. Rather, the consistent caching service may retrieve the up-to-date data item from the backing store, update the cached data item as well as both origin and parity tokens, and return the up-to-date data item.

In some embodiments, TTLs are also associated with the cached data items. In these embodiments, in response to a read request for a data item, the consistent caching service may first check whether the TTL associated with the cached data item has expired. If so, the consistent caching service may determine the invalidity or staleness of the cached data item solely based on the expired TTL and proceed directly to retrieve the up-to-date data item from the backing store and update the cached data item and its associated origin and parity tokens. If the TTL has not expired, the consistent caching service may further determine the validity or staleness based on a match or mismatch between the two tokens as discussed above.

In situations where there are multiple, overlapping read requests for the same data item, a flag or semaphore may be used by the consistent caching service to avoid the read requests competing against one another to update the cache. For example, a first read request may cause the consistent caching service to create or initiate a semaphore for updating the cached data item, and the semaphore may be deleted or reset when the updating is completed. Upon receiving other read requests for the same data item, the consistent caching service checks the status of the semaphore: if the semaphore exists or has been initiated, the consistent caching service simply bypasses the cache and retrieves the data item from the backing store.

Various aspects of the disclosure will now be described with regard to certain examples and embodiments, which are intended to illustrate but not to limit the disclosure. Nothing in this disclosure is intended to imply that any particular feature or characteristic of the disclosed embodiments is essential.

Figure 1:
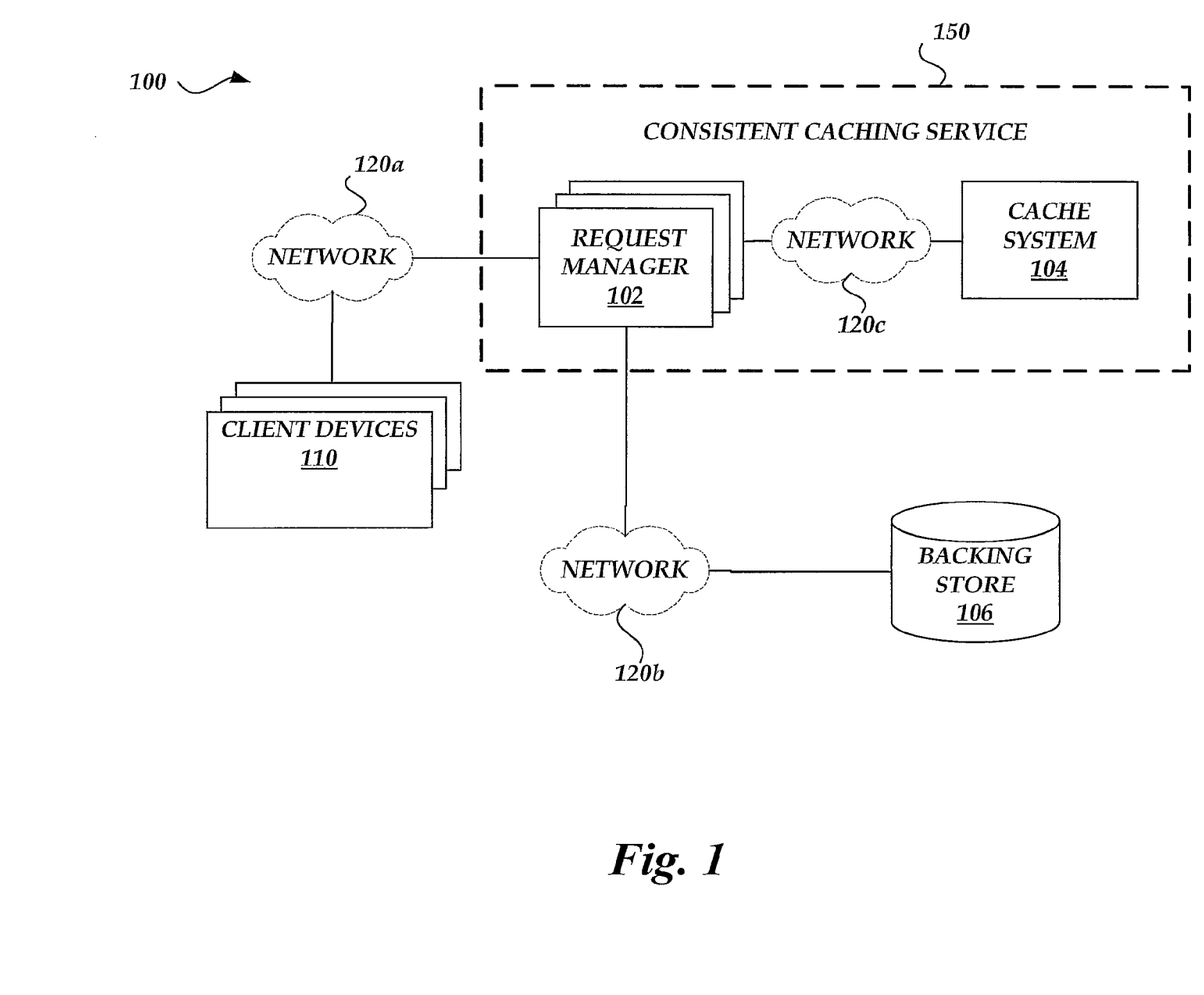
FIG. 1 is a block diagram schematically illustrating an embodiment of an operational environment including a consistent caching service that provides access to data with consistency between a cache system and a backing store.

FIG. 1 is a block diagram schematically illustrating an embodiment of an operational environment 100 including a consistent caching service 150 that provides access to data with consistency. The consistent caching service 150 may include a cache system 104. The cache system 104 can include one or more computing devices comprising processor(s), computer memory, network interface(s) and/or storage. The cache system 104 can also include other computing systems, with each sub-system including one or more computing devices. Some or all of the computing devices or systems of the cache system 104 can include a local cache. The cache system 104 can include physical computing systems or virtual computing systems operating on physical computing systems in a distributed manner. For example, the cache system 104, in one embodiment, can be implemented as a group of virtual machine instances operating on computers in one or more data centers. The cache system 104 may also include caches that are organized hierarchically. For example, there may be an ordered level of caches in the cache system 104 in which each level is considered the source for the lower level caches.

Generally, caches contain copies of data items that are kept temporarily in the cache but that are primarily stored, more persistently, elsewhere on a primary data storage device or devices (generally referred to as "backing store"). The cache system 104 may also maintain origin tokens and parity tokens associated with the cached data items. As discussed above, the origin tokens and parity tokens may be created by operations that populate data items to the cache. The consistent caching service 150 may employ various algorithms or techniques to ensure that the tokens created by different operations are distinct from one another. For example, the origin and parity tokens associated with a cached data item may correspond to a combination of an identifier of an actor (e.g., the internal ID of a request manager 102, an ID of a client device 110, combination of the same or the like) that caused the data item to be written/updated to the cache, a time stamp of the operation with sufficient accuracy and granularity, and a randomly generated integer.

The consistent caching service 150 may also include one or more request managers 102. The request manager 102 may be configured to receive and process requests for data items from client devices 110, communicate with the cache system 104 to retrieve, store or update cached data items and their associated origin and parity tokens, access data items stored in a backing store 106, and perform other relevant functionalities as disclosed herein. The request manager 102 can be software or hardware implemented on one or more computing devices comprising processor(s), computer memory, network interface(s) or storage. In some embodiments, the request managers 102 are communicatively connected to the cache system 104 via a network 120*c*, such as a private communication network (e.g., an intranet with a data center) or a publicly accessible communication network (e.g., the Internet). In other embodiments, the request manager 102 may be implemented as part of the cache system 104.

The backing store 106 may include mechanical drives (e.g., hard disk drives, optical disk, tape), solid state drives (SSDs) that use integrated circuit assemblies as memory to store data items persistently, or combinations of the above (e.g., hybrid drives). In the case of a cache miss, the consistent caching service 150 may search for data items on the backing store 106. In some embodiments, the request managers 102 are communicatively connected to the backing store 106 via a network 120b, such as a private or publicly accessible communication network.

The client devices 110 may correspond to a wide variety of devices including personal computing devices, laptop computing devices, hand-held computing devices, terminal computing devices, mobile devices (e.g., smartphones, tablets), wireless devices, various electronic devices (e.g., televisions) and appliances, and the like. The client devices 110 may support web browsing or otherwise access online computing services. For example, the client devices may be used by users to connect to various types of web sites, such as sites related to shopping, news, organizations, sports, games, product reviews or the like. Each client device 110 may be communicatively connected to one or more request managers 102 via a network 120a, which can be a publicly accessible network, such as the Internet. In some embodiments, the network 120a may include a private network, personal area network ("PAN"), LAN, WAN, cable network, satellite network, any other medium of computer data transfer, or some combination thereof. In some embodiments, individual client devices 110 may send requests with respect to data items to a request manager 102 designated to the client device 110. In other embodiments, individual client devices 110 may send requests with respect to data items to different request managers 102 in a dynamic manner, for example, based on network traffic, computational capacity, type or timing of requests, etc.

In an illustrative embodiment, the consistent caching service 150 may provide caching for a web server or other computing services that process requests from the client devices 110. The consistent caching service 150 can receive data item requests from the client devices, for example, on a network interface (e.g., Ethernet or other network interface card (NIC), 802.11a/b/g/n receiver, etc.) associated with one or more request managers 102 and process those requests. In one example, the client devices 110 operate web browsers that request web page or web application data items from the consistent caching service 150. The consistent caching service 150 may be part of a service provider that persistently stores data items on the backing store 106. The service provider may host many distinct sites, services, or applications for many different entities, and the cache system 104 caches data items for those distinct sites, services or applications.

In addition to caching, individual computers that implement at least some functionality of the consistent caching service 150 can also be used to provide other functions and services, such as running virtual machine instances, providing computing resources such as computing power and storage, running one or more web servers and/or providing other computing services. For example, the same computer may provide caching services as well as web server services.

The arrangement shown in FIG. 1 represents just one of many possible ways that the consistent caching service 150 may be arranged in an operational environment. For example, the illustrated networks 120a, 120b, or 120c may be different networks or part of the same network (e.g., the Internet). In one embodiment, the first network 120a is a public network while the second network 120b and third network 120c are different private networks.

As discussed above, data items can be primarily stored and cached from the backing store 106, which may include a variety of data repositories. The data repositories may be implemented using any type or types of physical computer storage. For example, such data repositories can include magnetic hard drives, solid state drives or memory, optical disc and/or the like. Various data structures can be used to store the data items, such as electronic files, databases or other data structures.

Figure 2A:
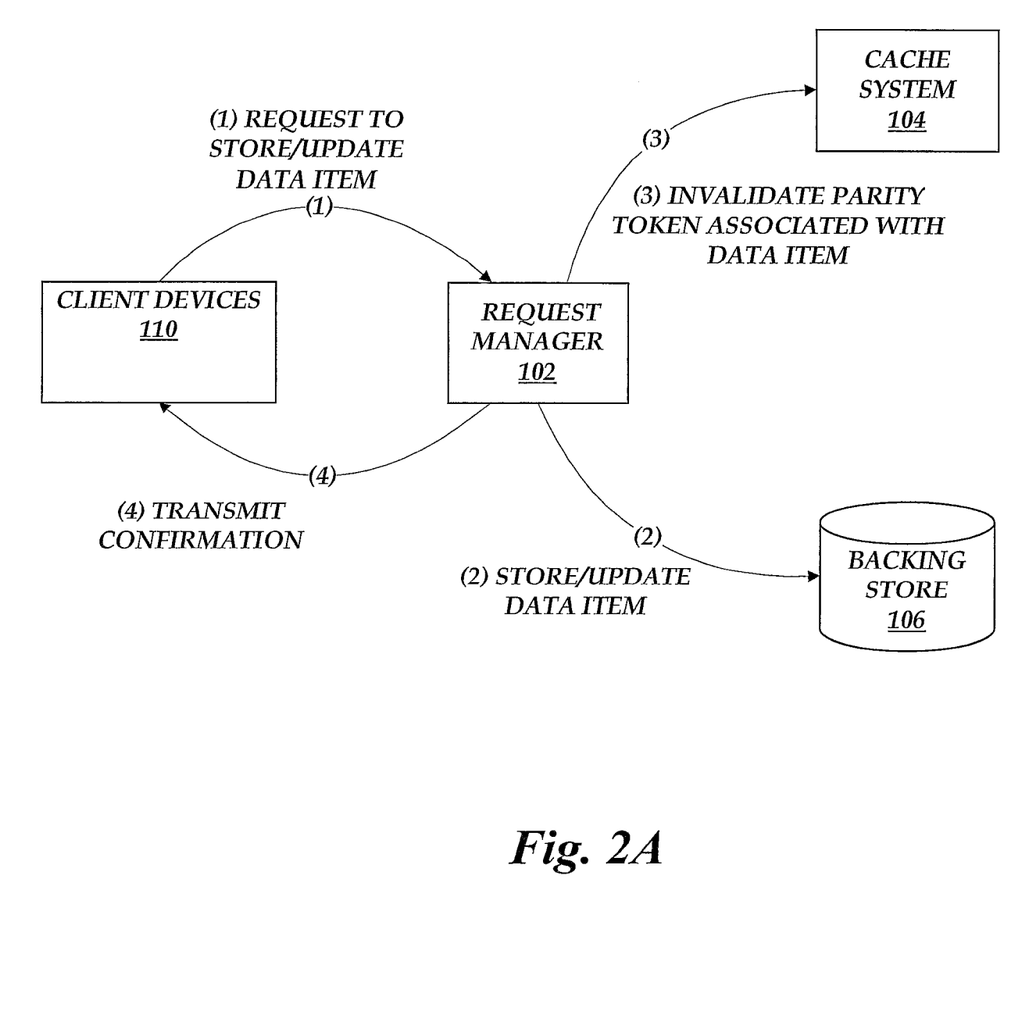
FIG. 2A illustrates example interactions among components of the operational environment of FIG. 1 for storing or updating a data item.

FIG. 2A illustrates example interactions among components of the operational environment 100 of FIG. 1 for storing or updating a data item. At (1), a client device 110 sends a request to a request manager 102 to store or update a data item. In some embodiments, the request is received on a networking interface of the request manager 102 as part of network packets sent over the network 120a by the client device 110. The request manager 102 can then process the request. For example, the request manager 102 may extract identification information for the data item (e.g., a filename, variable name, session ID, etc.) and use the data item identification to determine a logical or physical location within the backing store 106 where the data item is designated to be stored or maintained.

At (2), the request manager 102 stores or updates the data item to the backing store 106. Illustratively, the request manager 102 may access the backing store via an application program interface (API) and write new value(s) for the data item at its designated location. In some embodiments, the request manager 102 receives a confirmation from the backing store 106 that the data item has been successfully stored or updated.

At (3), the request manager 102 invalidates parity token(s) associated with the data item currently cached by the cache system 104. Illustratively, the request manager 102 may send an invalidation request via an API to the cache system 104 to delete or nullify a parity token associated with the cached data item. In some embodiments, the request manager 102 receives a confirmation from the cache system 104 that the parity token(s) has been successfully invalidated. In some embodiments, the invalidation request is asynchronous and the request manager 102 does not receive a success or fail confirmation from the cache system 104. In these embodiments, within a threshold period of time after sending the invalidation request, the request manager 102 may continue querying or polling the status of parity token(s) from the cache system 104 until they are either invalidated or no longer match the origin token associated with the data item.

At (4), the request manager 102 transmits a confirmation to the client device 110. Illustratively, the confirmation may indicate that the data item has been successfully stored or updated to the backing store. The confirmation may also indicate that data consistency between cache and backing store has been preserved, for example, if the request manager 102 were able to confirm the invalidation of the parity token.

Figure 2B:
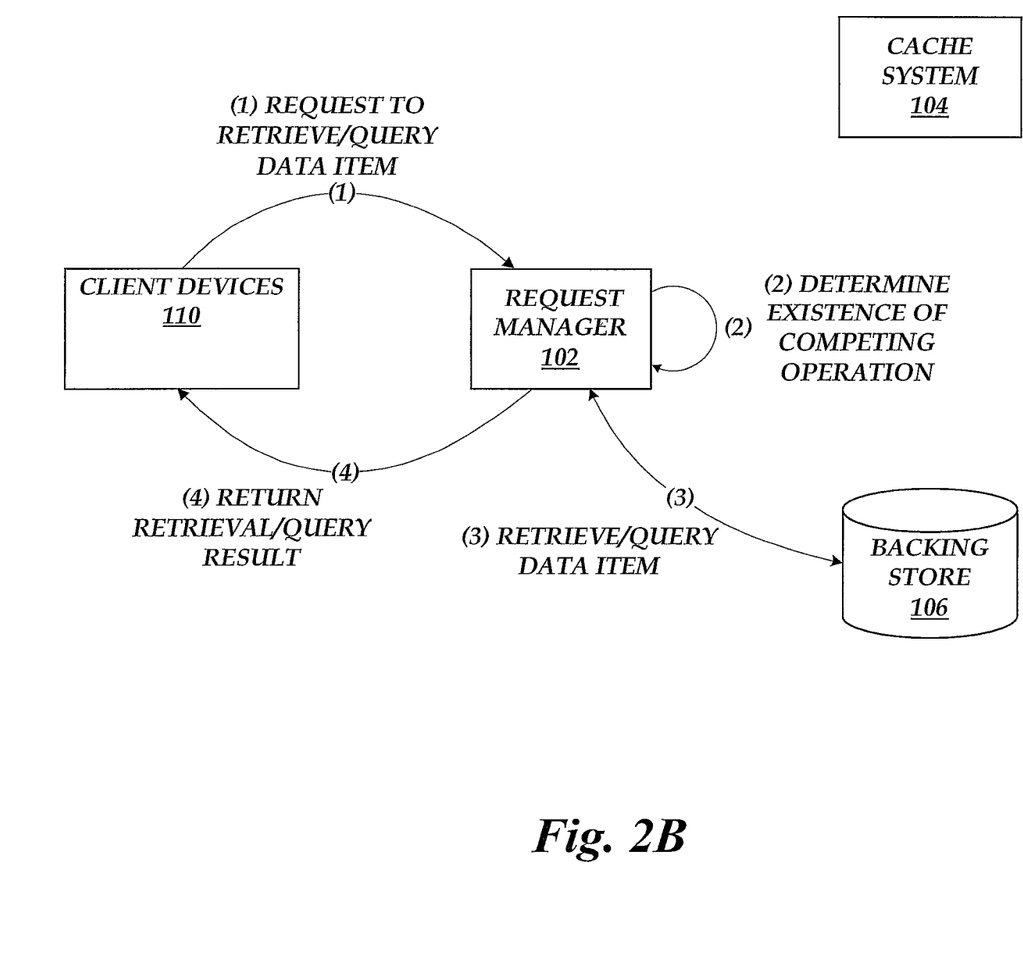
FIGS. 2B through 2D illustrate example interactions among components of the operational environment of FIG. 1 for retrieving or querying a data item.
Figure 2C:
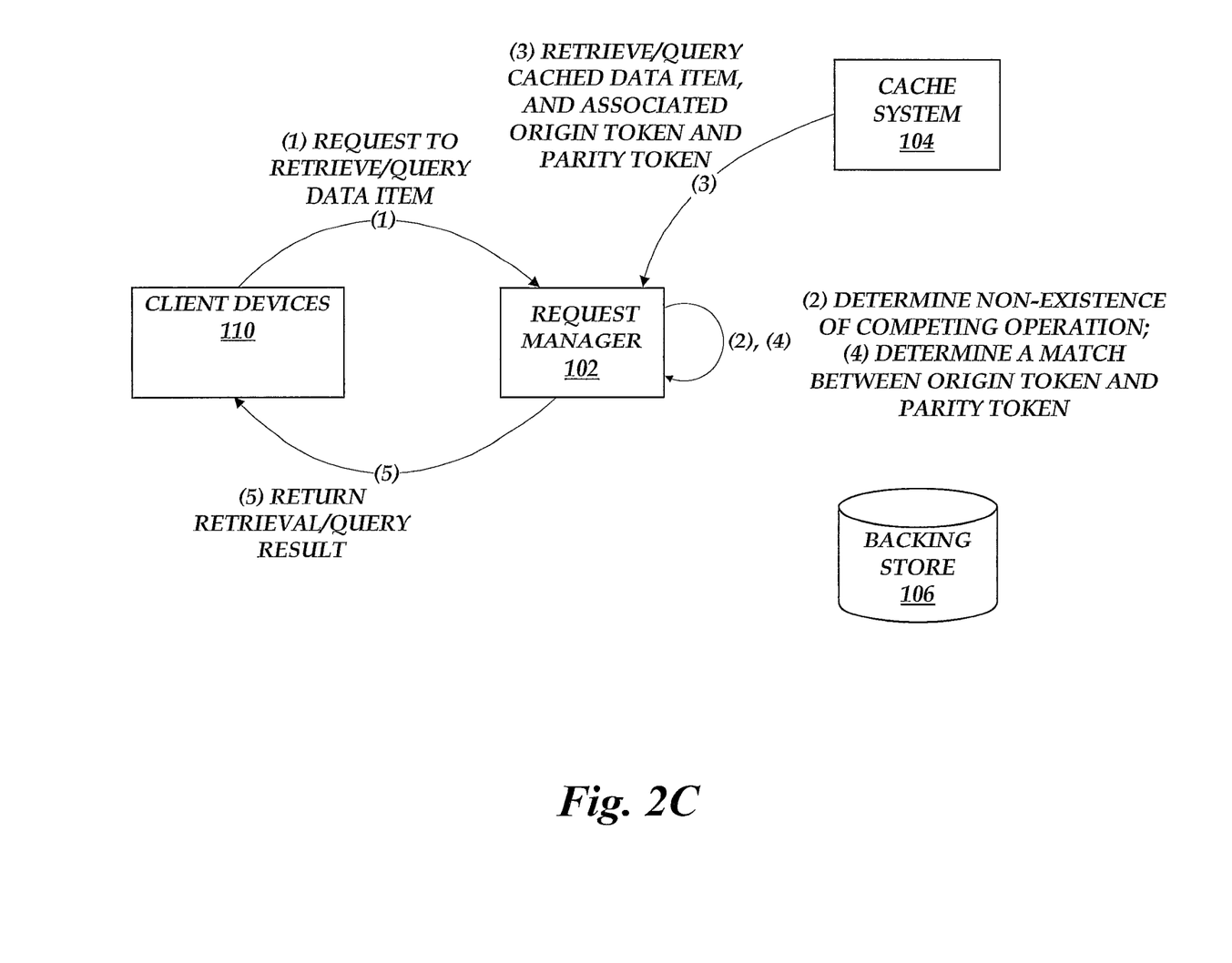
Figure 2D:
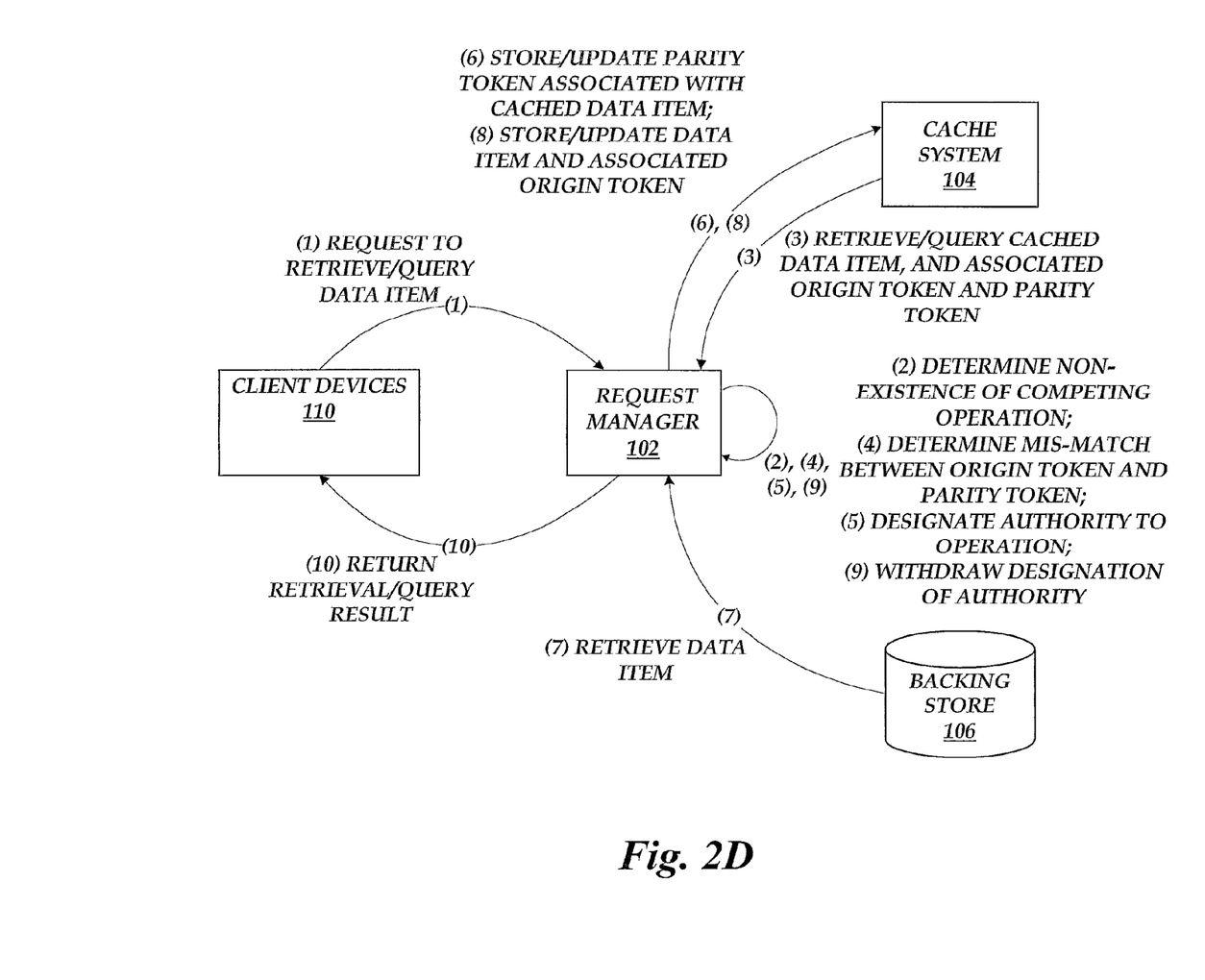

FIGS. 2B through 2D illustrate example interactions among components of the operational environment 100 of FIG. 1 for retrieving or querying a data item. Specifically, FIG. 2B illustrates examples interactions among components of the operational environment 100 when there is a competing operation with respect to the data item. With reference to FIG. 2B, at (1), a client device 110 sends a request to a request manager 102 to retrieve or query a data item. In some embodiments, the request is received on a networking interface of the request manager 102 as part of network packets sent over the network 120a by the client device 110. The request manager 102 can then process the request. For example, the request manager 102 may extract identification information for the data item (e.g., a filename, variable name, session ID, etc.) and use the data item identification to determine a logical or physical location within the cache system 104 or the backing store 106 where the data item is stored or otherwise maintained.

At (2), the request manager 102 determines whether there is a competing operation pending or ongoing with respect to the data item. For example, the request manager 102 may determine that a flag or semaphore associated with the data item has been created or initiated to indicate that the data item is being written to or updated in the cache system 104. If the request manager 102 determines that a competing operation exists, the request manager 102 does not proceed to retrieve or query the data item from the cache system 104.

At (3), the request manager 102 retrieves or queries the data item from the backing store 106. Illustratively, the request manager 102 may access the backing store 106 via an API and read current value(s) of the data item at its designated location. At (4), the request manager 102 returns the retrieved data item or query result to the client device 110.

FIG. 2C illustrates examples interactions among components of the operational environment 100 when there is no competing operation with respect to the data item and its associated origin and parity tokens match each other. With reference to FIG. 2C, at (1), a client device 110 sends a request to a request manager 102 to retrieve or query a data item. In some embodiments, the request is received on a networking interface of the request manager 102 as part of network packets sent over the network 120a by the client device 110. The request manager 102 can then process the request. For example, the request manager 102 may extract identification information of the data item (e.g., a filename, variable name, session ID, etc.) and use the data item identification to determine a logical or physical location within the cache system 104 and/or the backing store 106 where the data item is stored or otherwise maintained.

At (2), the request manager 102 determines whether there is any competing operation pending or ongoing with respect to the data item. For example, the request manager 102 may determine that a flag or semaphore associated with the data item has been not been created or initiated. At (3), the request manager 102 determines that there is no competing operation and proceeds to retrieve or query the data item as well as its associated origin and parity tokens from the cache system 104. Illustratively, the request manager 102 may retrieve or query the data item and its associated origin and parity tokens via one or more API requests to the cache system 104, based on the data item identification extracted at (1).

At (4), the request manager 102 determines whether the origin token matches the parity token. Illustratively, the request manager 102 may compare the origin token and the parity token and determine whether they correspond to a same operation that populated or caused the population of the cache. For example, the request manager 102 may specifically compare any identification information and time stamp included in the tokens. If the identification information in both tokens identify a same operation or entity and the time stamps in both tokens agree with each other, then the request manager 102 may determine a match between the origin token and the parity token. In some embodiments, the origin and parity tokens may not have the same format or encoding, and the request manager 102 may apply a matching algorithm or routine over the two tokens to determine if they match each other. At (5), the request manager 102 determines that the two token match each other and returns the retrieved cached data item or query result to the client device 110.

FIG. 2D illustrates examples interactions among components of the operational environment 100 when there is no competing operation with respect to the data item but its associated origin and parity tokens do not match each other. With reference to FIG. 2D, at (1), a client device 110 sends a request to a request manager 102 to retrieve or query a data item. In some embodiments, the request is received on a networking interface of the request manager 102 as part of network packets sent over the network 120a by the client device 110. The request manager 102 can then process the request. For example, the request manager 102 may extract identification information of the data item (e.g., a filename, variable name, session ID, etc.) and use the data item identification to determine a logical or physical location within the cache system 104 and/or the backing store 106 where the data item is stored or otherwise maintained.

At (2), the request manager 102 determines whether there is a competing operation pending or ongoing with respect to the data item. For example, the request manager 102 may determine that a flag or semaphore associated with the data item has been not been created or initiated. If so, at (3), the request manager 102 proceeds to retrieve or query the data item as well as its associated origin and parity tokens from the cache system 104. Illustratively, the request manager 102 may attempt to retrieve or query the data item and its associated origin and parity tokens via one or more API requests to the cache system 104, based on the data item identification extracted at (1).

At (4), the request manager 102 determines whether the origin token matches with the parity token. Illustratively, the request manager 102 may compare the origin token and the parity token to determine whether the origin token and the parity token correspond to a same operation that populated or caused the population of the cache. As discussed above, the request manager 102 may specifically compare any identification information and time stamp included in the tokens. If the identification information in both tokens point to different operations or entities, or if the time stamps in both tokens disagree with each other, the request manager 102 may determine a mismatch between the two tokens. In some embodiments, the request manager 102 may determine that the origin token and the parity token do not match because the request manager 102 has failed to retrieve the parity token from the cache system 104 (e.g., the parity token may have already been deleted or nullified by another operation).

At (5), the request manager 102 designates an authority to the current operation with respect to the data item so it has priority over later requests or operations with respect to the same data item. For example, the request manager 102 may create or initiate a flag or semaphore indicating that the current operation is in the process of writing or updating the cached version of the data item, thus preventing later requests or operations for the data item from fighting over control or authority over the cached data item.

At (6), the request manager 102 stores or updates the parity token associated with the data item to the cache system 104. As discussed earlier, the parity token may be updated to reflect the current operation in a unique way, based on an internal ID of the request manager 102, the client device 110, a current time stamp, combination of the same or the like. This may be achieved via an API request to the cache system 104, which may or may not be synchronous (e.g., returning a confirmation of success). At (7), the request manager 102 retrieves the data item from the backing store 106. Illustratively, the request manager 102 may access the backing store via an API and read current value(s) of the data item at its designated location.

At (8), the request manager 102 stores or updates the data item retrieved from the backing store 106, as well as its associated origin token, in the cache system 104. This may be achieved via one or more API requests to the cache system 104. As previously described, the API request(s) may or may not be synchronous. The origin token may be updated to match the updated parity token and reflect the current operation in a unique way, based on an internal ID of the request manager 102, the client device 110, a current time stamp, combination of the same or the like. In some embodiments, it should be noted that due to the asynchronous nature of the API requests, either or both of the origin or parity tokens associated with the data item may remain in its current form (e.g., still reflecting a previous operation or remaining in an invalidated status). Therefore, unless both the parity and origin tokens have been updated successfully to reflect a same operation, any request to retrieve or query the cached version of the data item will not cause the request manager 102 to return the cached data item due a mismatch between the origin and parity tokens.

At (9), the request manager 102 withdraws the designation of authority or priority of the current operation with respect to the cached data item. Illustratively, this can be achieved by deleting, nullifying, or resetting the flag or semaphore as discussed above at (5). Again, the withdrawal of declaration can be communicated via an API request to the cache system 104, which can be synchronous or asynchronous. In some embodiments, the flag or semaphore may be associated with a TTL to guarantee that the authority or control over the cached data item is released after a threshold period of time in case of an operational or communication failure. At (10), the request manager 102 returns the data item or query result to the client device 110.

Figure 3:
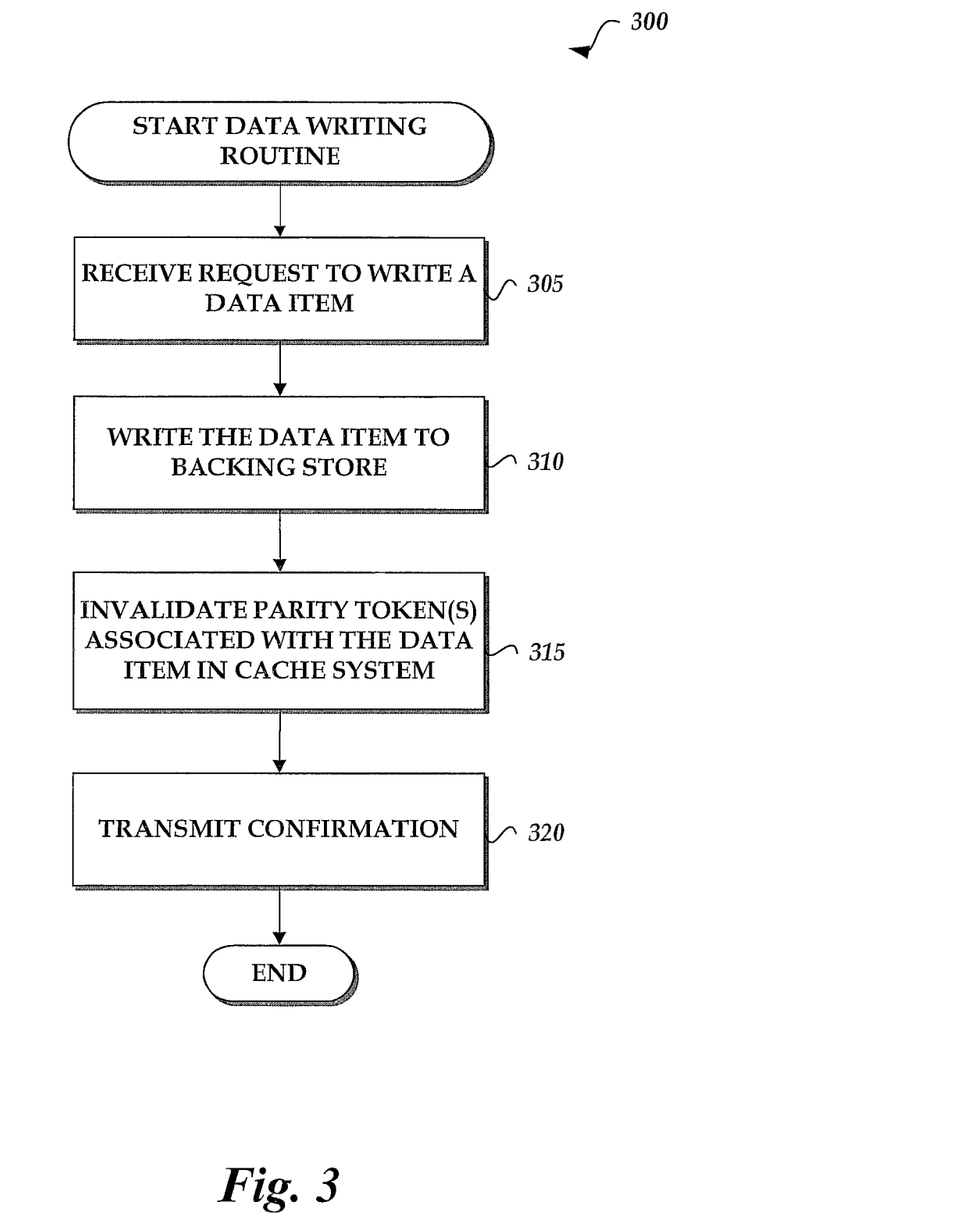
FIG. 3 illustrates a flow diagram for a data writing routine implemented by the consistent caching service of FIG. 1.

FIG. 3 illustrates a flow diagram for a data writing routine 300 implemented by the consistent caching service 150 of FIG. 1. At block 305, the consistent caching service 150 receives a request to write a data item from a data writing requestor. Illustratively, the data writing requestor may be a client device, a computational service, an application, a process, or a thread that accesses data via the consistent caching service 150. In some embodiments, the request is received from the same computing device where an interface of the consistent caching service 150 is implemented. The consistent caching service 150 can then process the request. For example, the consistent caching service 150 may extract identification information or metadata associated with the data item for locating the data item in a cache or backing store.

At block 310, the consistent caching service 150 writes the data item to the backing store 106. Illustratively, the consistent caching service 150 may make an API call to the backing store 106 and write the requested value(s) for the data item at its designated location. In some embodiments, the consistent caching service 150 receives a confirmation from the backing store 106 that the writing of the data item is successfully completed.

At block 315, the consistent caching service 150 invalidates parity token(s) associated with the data item that is currently cached in cache system 104. Illustratively, the consistent caching service 150 may delete or nullify any parity tokens associated with the data item. In some embodiments, the invalidation operation is asynchronous and does not return a success or failure notification. Within a threshold period of time after initiating the invalidation operation, the consistent caching service 150 may continue querying or polling the status of the parity token until it is either invalidated or no longer matches the origin token associated with the data item (e.g., a data reading routine such as routine 400 may have changed or caused change(s) to the parity or origin token).

At block 320, the consistent caching service 150 transmits a confirmation to the data writing requestor. Illustratively, the confirmation may indicate that the data item has been successfully written to the backing store and data consistency between cache and backing store has been preserved.

Figure 4:
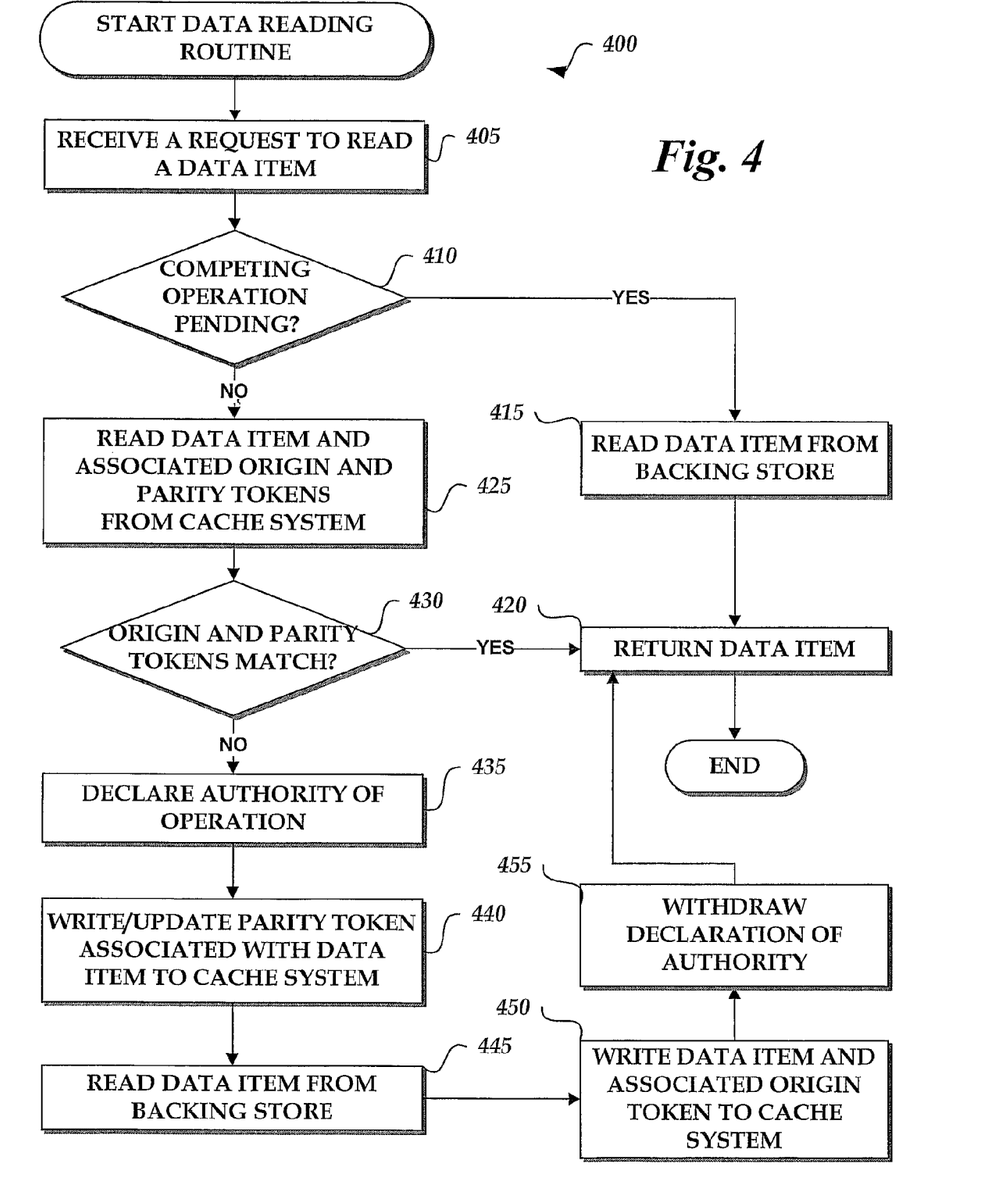
FIG. 4 illustrates a flow diagram for a data reading routine implemented by the consistent caching service of FIG. 1.

FIG. 4 illustrates a flow diagram for a data reading routine 400 implemented by the consistent caching service 150 of FIG. 1. At block 405, the consistent caching service 150 receives a request to read a data item from a data reading requestor. The data reading requestor may be a client device, a computational service, an application, a process, or a thread that access data via the consistent caching service 150. In some embodiments, the request is received from the same computing device where an interface of the consistent caching service 150 is implemented. The consistent caching service 150 can then process the request. For example, the request manager 102 may extract identification information or metadata associated with the data item for locating the data item in a cache or backing store.

At block 410, the consistent caching service 150 determines whether there is a competing operation pending or ongoing with respect to the data item. For example, the consistent caching service 150 may determine whether a flag or semaphore associated with the data item has been created or initiated to indicate that another operation is in the process of writing or updating the data item.

If the consistent caching service 150 determines there is a competing operation, the routine 400 proceeds to block 415, where the consistent caching service 150 reads the data item from the backing store 106. Illustratively, the consistent caching service 150 may access the backing store via an API call that returns current value(s) of the data item at its designated location in the backing store. At block 420, the consistent caching service 150 returns the data item to the data reading requestor and the routine 400 ends.

With reference back to block 410, if the consistent caching service 150 determines that there is no competing operation with respect to the data item, the routine 400 advances to block 425, where the consistent caching service 150 proceeds to read the cached copy of the data item as well as its associated origin and parity tokens. Illustratively, the consistent caching service 150 may read the data item and its associated origin and parity tokens via one or more API calls to the cache system 104.

At block 430, the consistent caching service 150 determines whether the origin token matches the parity token. Illustratively, the consistent caching service 150 may compare the origin token and the parity token and determine whether they correspond to a same operation that wrote or caused writing of the data item to the cache system 104. The consistent caching service 150 may specifically compare any identification information and/or time stamp included in the tokens to determine that they agree with each other between the origin token and the parity token. In some embodiments, the consistent caching service 150 may determine that the origin token and the parity token do not match because the parity token has been deleted or nullified by another operation.

If the consistent caching service 150 determines that the origin token matches the parity token, the routine 400 proceeds to block 420, where the consistent caching service 150 returns the cached data item to the data reading requestor and the routine 400 ends.

With reference back to block 430, if the consistent caching service 150 determines that the origin token does not match the parity token, the routine 400 proceeds to block 435, where the consistent caching service 150 declares authority or priority of the current operation with respect to the data item over later requests or operations. For example, the consistent caching service 150 may create or initiate a flag or semaphore indicating that the current operation is in the process of writing or updating the cached version of the data item, thus preventing later requests or operations for the data item from fighting over control or authority over the cached data item.

At block 440, the consistent caching service 150 writes or updates the parity token associated with the data item to the cache system 104. As discussed earlier, the parity token may be updated to reflect the current operation in a unique way, based on an ID of the data reading requestor, the update managing or processing entity (e.g., a request manager 102), a current time stamp, combination of the same or the like. At block 445, the consistent caching service 150 reads the data item from the backing store 106. Illustratively, the consistent caching service 150 may access the backing store via an API call that returns current value(s) of the data item at its designated location in the backing store 106.

At block 450, the consistent caching service 150 writes or updates the current value(s) of the data item and its associated origin token in the cache system 104. The origin token may be updated to match the updated parity token and reflect the current operation in a unique way, based on an ID of the data reading requestor, the update managing or processing entity (e.g., a request manager 102), a current time stamp, combination of the same or the like. It should be noted that operational or communication failures, glitches, or exceptions may cause either or both of the origin or parity tokens to remain in its current form (e.g., still reflecting a previous operation or remaining in an invalidated status). Therefore, unless both the parity and origin tokens have been successfully written to reflect a same operation, any request to read the cached version of the data item will not cause the consistent caching service 150 to return the cached data item due to a mismatch between the origin and parity tokens.

At block 455, the request manager 102 withdraws the declaration of authority or priority of the current operation. Illustratively, this can be achieved by deleting, nullifying, or resetting the flag or semaphore as discussed above at block 435. In some embodiments, the flag or semaphore may be associated with a self-decrementing expiration timer that guarantees the authority or control over the cached data item is released after a threshold period of time. At block 420, the consistent caching service 150 returns the data item to the data reading requestor and the routine 400 ends.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware (e.g., application-specific logic circuitry), computer software executed by hardware, or combinations of both. To clearly illustrate this interchangeability of hardware and software, various illustrative components, blocks, modules, and steps have been described above generally in terms of their functionality. Whether such functionality is implemented as hardware, or as software executed by hardware, depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a computing device, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements, and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system for managing data consistency between a cache system and a data repository, comprising:
   a data repository comprising a physical data storage medium for persistently storing a plurality of data items;
   a cache system comprising one or more physical processors and memory for storing a cached data item, an origin token associated with the cached data item, and a parity token associated with the cached data item, wherein the cached data item corresponds to a target data item of the plurality of data items;
   a first request management unit comprising a physical processor, the first request management unit configured to:
      receive a first request to update the target data item;
      cause an update of the target data item in the data repository; and
      invalidate the parity token associated with the cached data item; and
   a second request management unit comprising a physical processor, the second request management unit configured to:
      receive a second request to retrieve the target data item;
      in response to determining a mismatch between the parity token stored in the cache system and the origin token stored in the cache system, update the parity token with one or more identifiers associated with the second request;
      cause an update to the cached data item in the cache system to reflect a current value of the target data item from the data repository;
      update the origin token with the one or more identifiers associated with the second request; and
      return the cached data item.

2. The system of claim 1 comprising:
   a third request management unit comprising a physical processor, the third request management unit configured to:
      receive a third request to retrieve the target data item;
      in response to determining a match between the parity token and the origin token, retrieve the cached data item from the cache system; and
      return the cached data item.

3. The system of claim 2, wherein at least two of the first, second, and third request management units correspond to a same request management unit.

4. The system of claim 1, wherein the one or more identifiers associated with the second request include at least one of an identifier of the second request management unit or a time stamp associated with processing of the second request.

5. The system of claim 1, wherein the first request and second request are received from different computing devices.

6. A method for managing data consistency between a backing store that stores a plurality of data items and a cache that maintains a subset of cached data items comprising:
   receiving a request to read a target data item, wherein a cached data item corresponding to the target data item is stored in a cache;
   in response to determining a mismatch between a parity token associated with the cached data item and an origin token associated with the cached data item, wherein the parity token and the origin token are stored in the cache:
   updating the cached data item to reflect a current value of the target data item;
   updating the parity token and the origin token so that the parity token and the origin token match each other; and
   returning the cached data item in response to the request to read the target data item,
   the method performed programmatically by one or more computing systems under control of executable program code.

7. The method of claim 6, wherein the target data item is persistently stored in a backing store.

8. The method of claim 6, wherein updating the parity token and the origin token comprises updating the parity token and the origin token with a unique identifier.

9. The method of claim 6 further comprising determining whether a competing operation with respect to the cached data item is pending prior to updating the cached data item.

10. The method of claim 9, wherein determining whether a competing operation is pending comprises determining whether a semaphore associated with the cached data item has been initiated.

11. The method of claim 10 further comprising:
   in response to determining that the semaphore has not been initiated, initiating the semaphore to indicate the updating of the cached data item.

12. The method of claim 11 further comprising resetting the semaphore in response to creating the match between the parity token and the origin token.

13. The method of claim 6 comprising determining the mismatch between the parity token and the origin token based, at least part, on an invalidation of the parity token.

14. The method of claim 13 further comprising invalidating the parity token in response to a request to write the target data item.

15. Non-transitory computer storage having stored thereon instructions that, when executed by a computer system, cause the computer system to perform operations comprising:

receiving a first request to read a cached data item, wherein the cached data item corresponds to a copy of a target data item stored in a backing store, and wherein a parity token and an origin token are associated with the cached data item and stored with the cached data item;

in response to determining a match between the parity token associated with the cached data item and the origin token associated with the cached data item, returning the cached data item;

receiving a second request to write the cached data item;

causing a write operation to the target data item in the backing store in accordance with the second request; and invalidating the parity token associated with the cached data item.

16. The non-transitory computer storage of claim 15, where in the match between the parity token and the origin token is based, at least in part, on a comparison of time stamps associated with the parity token and the origin token.

17. The non-transitory computer storage of claim 15, wherein invalidating the parity token corresponds to deleting or nullifying the parity token.

18. The non-transitory computer storage of claim 15, wherein invalidating the parity token comprises sending an API request for invalidating the parity token.

19. The non-transitory computer storage of claim 18, wherein the API request is asynchronous.

20. The non-transitory computer storage of claim 15, wherein invalidating the parity token causes a mismatch between the parity token and the origin token.

* * * * *